(12) United States Patent
Duthaler et al.

(10) Patent No.: US 8,077,141 B2
(45) Date of Patent: Dec. 13, 2011

(54) BACKPLANES FOR ELECTRO-OPTIC DISPLAYS

(75) Inventors: Gregg M. Duthaler, Needham, MA (US); Robert W. Zehner, Belmont, MA (US); Charles Howie Honeyman, Roslindale, MA (US); Kevin L. Denis, Bowie, MD (US); Matthew A. King, Marina del Rey, CA (US); Jianna Wang, Grafton, MA (US)

(73) Assignee: E Ink Corporation, Cambridge, MA (US)

( * ) Notice: Subject to any disclaimer, the term of this patent is extended or adjusted under 35 U.S.C. 154(b) by 677 days.

(21) Appl. No.: 12/046,489

(22) Filed: Mar. 12, 2008

(65) Prior Publication Data

US 2008/0165122 A1 Jul. 10, 2008

Related U.S. Application Data

(62) Division of application No. 10/707,466, filed on Dec. 16, 2003, now Pat. No. 7,365,733.

(60) Provisional application No. 60/319,786, filed on Dec. 16, 2002.

(51) Int. Cl.
*G09G 3/34* (2006.01)

(52) U.S. Cl. ........................ 345/107; 345/111

(58) Field of Classification Search .......... 345/107, 345/111

See application file for complete search history.

(56) References Cited

U.S. PATENT DOCUMENTS

| | | |
|---|---|---|
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,336,536 A | 6/1982 | Kalt et al. |
| 4,418,346 A | 11/1983 | Batchelder |
| 5,233,459 A | 8/1993 | Bozler et al. |
| 5,393,710 A | 2/1995 | Park et al. |
| 5,745,094 A | 4/1998 | Gordon, II et al. |
| 5,760,761 A | 6/1998 | Sheridon |

(Continued)

FOREIGN PATENT DOCUMENTS

EP 1 145 072 B1 5/2003

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner* — Kevin M Nguyen (74) *Attorney, Agent, or Firm* — David J. Cole (57) ABSTRACT

A backplane for an electro-optic display comprises a pixel electrode (104), a voltage supply line (C) arranged to supply a voltage to the pixel electrode (104), and a micromechanical switch (106, 112) disposed between the voltage supply line (C) and the pixel electrode (104), the micromechanical switch (106, 112) having an open state, in which the voltage supply line (C) is not electrically connected to the pixel electrode (104), and a closed state, in which the voltage supply line (C) is electrically connected to the pixel electrode (104).

18 Claims, 8 Drawing Sheets

U.S. PATENT DOCUMENTS

| | | | |
|---|---|---|---|
| 5,777,782 | A | 7/1998 | Sheridon |
| 5,784,190 | A | 7/1998 | Worley |
| 5,808,783 | A | 9/1998 | Crowley |
| 5,872,552 | A | 2/1999 | Gordon, II et al. |
| 5,930,026 | A | 7/1999 | Jacobson et al. |
| 5,961,804 | A | 10/1999 | Jacobson et al. |
| 6,017,584 | A | 1/2000 | Albert et al. |
| 6,054,071 | A | 4/2000 | Mikkelsen, Jr. |
| 6,055,091 | A | 4/2000 | Sheridon et al. |
| 6,067,185 | A | 5/2000 | Albert et al. |
| 6,097,531 | A | 8/2000 | Sheridon |
| 6,109,717 | A * | 8/2000 | Kane et al. ............... 347/12 |
| 6,118,426 | A | 9/2000 | Albert et al. |
| 6,120,588 | A | 9/2000 | Jacobson |
| 6,120,839 | A | 9/2000 | Comiskey et al. |
| 6,124,851 | A | 9/2000 | Jacobson |
| 6,128,124 | A | 10/2000 | Silverman |
| 6,130,773 | A | 10/2000 | Jacobson et al. |
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,172,798 | B1 | 1/2001 | Albert et al. |
| 6,177,921 | B1 | 1/2001 | Comiskey et al. |
| 6,184,856 | B1 | 2/2001 | Gordon, II et al. |
| 6,225,971 | B1 | 5/2001 | Gordon, II et al. |
| 6,232,950 | B1 | 5/2001 | Albert et al. |
| 6,241,921 | B1 | 6/2001 | Jacobson et al. |
| 6,249,271 | B1 | 6/2001 | Albert et al. |
| 6,252,564 | B1 | 6/2001 | Albert et al. |
| 6,262,706 | B1 | 7/2001 | Albert et al. |
| 6,262,833 | B1 | 7/2001 | Loxley et al. |
| 6,271,823 | B1 | 8/2001 | Gordon, II et al. |
| 6,300,932 | B1 | 10/2001 | Albert |
| 6,301,038 | B1 | 10/2001 | Fitzmaurice et al. |
| 6,312,304 | B1 | 11/2001 | Duthaler et al. |
| 6,312,971 | B1 | 11/2001 | Amundson et al. |
| 6,323,989 | B1 | 11/2001 | Jacobson et al. |
| 6,327,072 | B1 | 12/2001 | Comiskey et al. |
| 6,376,828 | B1 | 4/2002 | Comiskey |
| 6,377,387 | B1 | 4/2002 | Duthaler et al. |
| 6,392,785 | B1 | 5/2002 | Albert et al. |
| 6,392,786 | B1 | 5/2002 | Albert |
| 6,413,790 | B1 | 7/2002 | Duthaler et al. |
| 6,422,687 | B1 | 7/2002 | Jacobson |
| 6,445,374 | B2 | 9/2002 | Albert et al. |
| 6,445,489 | B1 | 9/2002 | Jacobson et al. |
| 6,459,418 | B1 | 10/2002 | Comiskey et al. |
| 6,473,072 | B1 | 10/2002 | Comiskey et al. |
| 6,480,182 | B2 | 11/2002 | Turner et al. |
| 6,498,114 | B1 | 12/2002 | Amundson et al. |
| 6,504,524 | B1 | 1/2003 | Gates et al. |
| 6,506,438 | B2 | 1/2003 | Duthaler et al. |
| 6,512,354 | B2 | 1/2003 | Jacobson et al. |
| 6,515,649 | B1 | 2/2003 | Albert et al. |
| 6,518,949 | B2 | 2/2003 | Drzaic |
| 6,521,489 | B2 | 2/2003 | Duthaler et al. |
| 6,531,997 | B1 | 3/2003 | Gates et al. |
| 6,535,197 | B1 | 3/2003 | Comiskey et al. |
| 6,538,801 | B2 | 3/2003 | Jacobson et al. |
| 6,545,291 | B1 | 4/2003 | Amundson et al. |
| 6,580,545 | B2 | 6/2003 | Morrison et al. |
| 6,639,578 | B1 | 10/2003 | Comiskey et al. |
| 6,652,075 | B2 | 11/2003 | Jacobson |
| 6,657,772 | B2 | 12/2003 | Loxley |
| 6,664,944 | B1 | 12/2003 | Albert et al. |
| D485,294 | S | 1/2004 | Albert |
| 6,672,921 | B1 | 1/2004 | Liang et al. |
| 6,680,725 | B1 | 1/2004 | Jacobson |
| 6,683,333 | B2 | 1/2004 | Kazlas et al. |
| 6,693,620 | B1 | 2/2004 | Herb et al. |
| 6,704,133 | B2 | 3/2004 | Gates et al. |
| 6,710,540 | B1 | 3/2004 | Albert et al. |
| 6,721,083 | B2 | 4/2004 | Jacobson et al. |
| 6,724,519 | B1 | 4/2004 | Comiskey et al. |
| 6,727,881 | B1 | 4/2004 | Albert et al. |
| 6,738,050 | B2 | 5/2004 | Comiskey et al. |
| 6,750,473 | B2 | 6/2004 | Amundson et al. |
| 6,753,999 | B2 | 6/2004 | Zehner et al. |
| 6,788,449 | B2 | 9/2004 | Liang et al. |
| 6,816,147 | B2 | 11/2004 | Albert |
| 6,819,471 | B2 | 11/2004 | Amundson et al. |
| 6,822,782 | B2 | 11/2004 | Honeyman et al. |
| 6,825,068 | B2 | 11/2004 | Denis et al. |
| 6,825,829 | B1 | 11/2004 | Albert et al. |
| 6,825,970 | B2 | 11/2004 | Goenaga et al. |
| 6,831,769 | B2 | 12/2004 | Holman et al. |
| 6,839,158 | B2 | 1/2005 | Albert et al. |
| 6,842,167 | B2 | 1/2005 | Albert et al. |
| 6,842,279 | B2 | 1/2005 | Amundson |
| 6,842,657 | B1 | 1/2005 | Drzaic et al. |
| 6,864,875 | B2 | 3/2005 | Drzaic et al. |
| 6,865,010 | B2 | 3/2005 | Duthaler et al. |
| 6,866,760 | B2 | 3/2005 | Paolini Jr. et al. |
| 6,870,661 | B2 | 3/2005 | Pullen et al. |
| 7,316,942 | B2 * | 1/2008 | Sarma et al. ............... 438/149 |
| 2002/0060321 | A1 | 5/2002 | Kazlas et al. |
| 2002/0063661 | A1 | 5/2002 | Comiskey et al. |
| 2002/0090980 | A1 | 7/2002 | Wilcox et al. |
| 2002/0113770 | A1 | 8/2002 | Jacobson et al. |
| 2002/0130832 | A1 | 9/2002 | Baucom et al. |
| 2002/0180687 | A1 | 12/2002 | Webber |
| 2003/0011560 | A1 | 1/2003 | Albert et al. |
| 2003/0020844 | A1 | 1/2003 | Albert et al. |
| 2003/0102858 | A1 | 6/2003 | Jacobson et al. |
| 2003/0132908 | A1 | 7/2003 | Herb et al. |
| 2003/0137521 | A1 | 7/2003 | Zehner et al. |
| 2003/0151702 | A1 | 8/2003 | Morrison et al. |
| 2003/0214695 | A1 | 11/2003 | Abramson et al. |
| 2003/0222315 | A1 | 12/2003 | Amundson et al. |
| 2004/0012839 | A1 | 1/2004 | Cao et al. |
| 2004/0014265 | A1 | 1/2004 | Kazlas et al. |
| 2004/0027327 | A1 | 2/2004 | LeCain et al. |
| 2004/0075634 | A1 | 4/2004 | Gates |
| 2004/0094422 | A1 | 5/2004 | Pullen et al. |
| 2004/0105036 | A1 | 6/2004 | Danner et al. |
| 2004/0112750 | A1 | 6/2004 | Jacobson et al. |
| 2004/0119681 | A1 | 6/2004 | Albert et al. |
| 2004/0136048 | A1 | 7/2004 | Arango et al. |
| 2004/0155857 | A1 | 8/2004 | Duthaler et al. |
| 2004/0180476 | A1 | 9/2004 | Kazlas et al. |
| 2005/0035941 | A1 | 2/2005 | Albert et al. |

FOREIGN PATENT DOCUMENTS

| | | |
|---|---|---|
| JP | 11-202801 A | 7/1999 |
| JP | 11-202802 A | 7/1999 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |
| WO | WO 03/107315 | 12/2003 |

OTHER PUBLICATIONS

Bach, U., et al., "Nanomaterials-Based Electrochromics for Paper-Quality Displays", Adv. Mater, 14(11), 845 (2002).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

IBM Technical Disclosure Bulletin, 30(6), 393-394 (1987), "Three-terminal latching micromechanical switch".

Jacobson, J., et al., "The last book", IBM Systems J., 36, 457 (1997).

Jo, G-R, et al., "Toner Display Based on Particle Movements", Chem. Mater, 14, 664 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

* cited by examiner

BACKPLANES FOR ELECTRO-OPTIC DISPLAYS

REFERENCE TO RELATED APPLICATIONS

This application is a divisional of copending application Ser. No. 10/707,466, filed Dec. 16, 2003 (Publication No. 2004/0196215), which itself claims benefit of Application Ser. No. 60/319,786, filed Dec. 16, 2002.

This application is also related to copending Application Ser. No. 60/375,508, filed Apr. 24, 2002, and application Ser. No. 10/249,618, filed Apr. 24, 2003 (now U.S. Pat. No. 7,116,318. The entire disclosures of the aforementioned applications, and of all U.S. patents and published and copending applications referred to below, are also herein incorporated by reference.

BACKGROUND OF INVENTION

This invention relates to backplanes for electro-optic displays, and to processes for the formation of such backplanes. The backplanes of the present invention are especially, but not exclusively, intended for use with particle-based electrophoretic displays in which one or more types of electrically charged particles are suspended in a liquid and are moved through the liquid under the influence of an electric field to change the appearance of the display.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801;

6,545,291; 6,580,545; 6,639,578; 6,652,075; and 6,657,772; and U.S. Patent Applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0171910; 2002/0180687; 2002/0180688; 2002/0185378; 2003/0011560; 2003/0011868; 2003/0020844; 2003/0025855; 2003/0034949; 2003/0038755; 2003/0053189; 2003/0076573; 2003/0096113; 2003/0102858; 2003/0132908; 2003/0137521; 2003/0137717; 2003/0151702; and 2003/0214697 and International Applications Publication Nos. WO 99/67678; WO 00/05704; WO 00/38000; WO 00/38001; WO 00/36560; WO 00/67110; WO 00/67327; WO 01/07961; and WO 01/08241.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within capsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Other types of electro-optic displays, including liquid crystal displays, may also make use of the backplanes of the present invention.

Obviously, in order for an electro-optic display to operate, it is necessary to arrange for the provision of controllable electric fields across the electro-optic medium to switch the medium among its various optical states, and thus to arrange electrodes on both sides of the medium. In the simplest form of display, each pixel of the display is associated with a separate electrode provided with its own switchable connection to various voltage levels. However, in a high resolution display, for example a VGA (640×480) display, this architecture becomes impracticable because of the enormous number of electrical leads required. Accordingly, it is common in such displays to use an active matrix display architecture which has a single common, transparent electrode on one side of the electro-optic layer, this common electrode extending across all the pixels of the display. Typically, this common electrode lies between the electro-optic layer and the observer and forms a viewing surface through which an observer views the display. On the opposed side of the electro-optic layer is disposed a matrix of pixel electrodes arranged in rows and columns such that each pixel electrode is uniquely defined by the intersection of a single row and a single column. Thus, the electric field experienced by each pixel of the electro-optic layer is controlled by varying the voltage applied to the associated pixel electrode relative to the voltage applied to the common front electrode. Each pixel electrode is associated with at least one non-linear device, typically a thin film transistor, although diodes can also be used. The gates of the transistors in each row are connected via a single elongate row electrode to a row driver. The source electrodes of the transistors in each column are connected via a single elongate column electrode to a column driver. The drain electrode of each transistor is connected directly to the pixel electrode. It will be appreciated that the assignment of the gates to rows and the source electrodes to columns is arbitrary, and could be reversed, as could the assignment of source and drain electrodes. The array of non-linear devices and their associated row and column electrodes form the backplane of the display; typically, this backplane will include the row and column driver circuitry in the same physical unit. In many electro-optic displays, an active matrix architecture allows the relatively complex backplane to be fabricated separately from the remainder of the display using conventional semiconductor fabrication techniques. The remainder, or front portion, of the display may, for example, be fabricated inexpensively by depositing a layer of electro-optic medium on a polymeric film on which has previously been deposited a substantially transparent conductive layer, formed, for example, from indium tin oxide (ITO) or an organic polymeric conductor. The front portion of the display is then typically laminated to the backplane.

As already mentioned, display backplanes are fabricated using semiconductor fabrication techniques. However, the present state of such techniques is not optimized for fabrication of backplanes. Semiconductor fabrication technology has been driven by the need to manufacture the enormous complex integrated circuits ("chips") used as central processing units ("CPU's") and other logic units in computers. Such CPU's require the provision of millions of transistors in each unit, and both the requirements to minimize heat dissipation within the CPU and the economic need to form as many CPU's as possible on each semiconductor wafer processed (the cost of processing the wafer being essentially independent of the number of CPU's formed) have led to very high packing densities of transistors; the latest CPU's are fabricated using technology in which individual features can be as small as about 0.13 µm, with individual transistors of the order of 1 µm square, and spacings between adjacent transistors of the same order of magnitude. Such small transistors and high packing densities are not needed in display backplanes, which will typically have pixels, and thus transistors or other non-linear devices, spaced at intervals of the order of 0.1 mm. In addition, backplanes are typically of the order of 100 mm square (and can be much larger) and thus much greater in size than chips. Consequently, there is a great need to reduce the cost per unit area of fabricating backplanes.

The present invention provides various improvements in backplanes and processes for their fabrication.

SUMMARY OF INVENTION

Accordingly, in one aspect this invention provides a backplane for an electro-optic display, the backplane comprising a pixel electrode, a voltage supply line arranged to supply a voltage to the pixel electrode, and a micromechanical switch disposed between the voltage supply line and the pixel electrode, the micromechanical switch having an open state, in which the voltage supply line is not electrically connected to the pixel electrode, and a closed state, in which the voltage supply line is electrically connected to the pixel electrode.

This aspect of the invention may hereinafter for convenience be referred to as the MicroElectroMechanical System ("MEMS") backplane of the invention. In one form of such a MEMS backplane, the micromechanical switch comprises a cantilever beam capable of moving into and out of contact with a first electrode, and a second electrode arranged to move the cantilever beam. Such a MEMS backplane may further comprise a capacitor electrode disposed adjacent the first electrode such that the capacitor electrode and the first electrode form a capacitor. A MEMS backplane may be provided with an encapsulant layer covering the micromechanical switch.

This invention extends to an electro-optic display ("a MEMS display") comprising a MEMS backplane. Thus, in another aspect this invention provides an electro-optic display comprising:

a layer of an electro-optic medium having first and second display states differing in at least one optical property, the electro-optic medium being capable of being changed from its first to its second display state by application of an electric field to the medium; and a backplane disposed adjacent the layer of electro-optic medium, the backplane comprising a pixel electrode arranged, upon application of a voltage thereto, to apply an electric field to the electro-optic medium, the backplane further comprising a voltage supply line arranged to supply a voltage to the pixel electrode, and a micromechanical switch disposed between the voltage supply line and the pixel electrode, the micromechanical switch having an open state, in which the voltage supply line is not electrically connected to the pixel electrode, and a closed state, in which the voltage supply line is electrically connected to the pixel electrode.

Such a MEMS display may further comprise a light transmissive electrode disposed on the opposed side of the layer of electro-optic medium from the backplane. The electro-optic medium in a MEMS display may be of any of the types discussed above. Thus, for example, the electro-optic medium may be a rotating bichromal member or electrochromic medium. Alternatively, the electro-optic medium may be an encapsulated electrophoretic medium, which may be of the type in which the electrophoretic particles are encapsulated within true capsule walls, of the polymer-dispersed type, or of the microcell type.

This invention also provides a process for forming a backplane for an electro-optic display, the process comprising:

providing a substrate;

forming spaced first, second and third electrodes on the substrate;

thereafter forming a sacrificial layer on the substrate, the sacrificial layer covering the first and second electrodes but leaving at least part of the third electrode exposed;

thereafter depositing conductive material on to the substrate so as to form a cantilever beam member having a first section contacting the exposed part of the third electrode, and a second section extending over the sacrificial layer so as to extend over at least part of each of the second and first electrodes; and thereafter removing the sacrificial layer, thereby leaving the second section of the cantilever beam member free to into and out of contact with the first electrode under the influence of a voltage applied to the second electrode.

In this process, the step of depositing conductive material on to the substrate may include depositing a capacitor electrode spaced from the cantilever beam member but overlying part of the first electrode so that the capacitor electrode and the first electrode together form a capacitor. The process may also include, after removal of the sacrificial layer, depositing an encapsulant layer on to the substrate so as to cover at least the cantilever beam member.

In another aspect, this invention provides a process for forming at least one electronic component of an electronic circuit on a substrate, the process comprising:

forming on the substrate a layer of a component material which can form the at least one electronic component;

forming a layer of an embossable material over the layer of component material;

imagewise embossing the layer of embossable material to form at least one first portion and at least one second portion having a greater thickness than that of the at least one first portion;

etching the embossable material to remove the at least one first portion thereof while leaving embossable material present in the at least one second portion thereof, thereby exposing the component material underlying the at least one first portion of the embossable material; and thereafter etching the exposed portions of the component material, thereby patterning the layer of component material and forming the at least one electronic component therein.

This aspect of the invention may hereinafter for convenience be referred to as the embossing process of the invention. The embossing process may include, after patterning of the layer of component material, removing the remaining embossable material from the substrate. The imagewise embossing of the embossable material may be effected by a roller. The embossable material may comprise a photoresist. The photoresist may be heated ("soft baked") prior to the imagewise embossing thereof, in order to remove solvent from the photoresist. Alternatively or in addition, the photoresist may be heated ("hard baked") after the etching to remove the at least one first portion thereof, but before the etching of the component material.

The embossable material may comprise a copolymer having repeating units derived from at least one base soluble monomer. This at least one base soluble monomer may comprise a blocking group which deblocks in the presence of an acid. Preferred copolymers for this purpose include those having repeating units derived from 4-hydroxystyrene and a methacrylate.

Finally, this invention provides a backplane for an electro-optic display, the backplane comprising:

a substrate;

a transistor disposed on the substrate;

a passivation layer covering the transistor;

a pixel electrode disposed on the opposed side of the passivation layer from the transistor; and a conductive via passing through the passivation layer and electrically connecting the transistor to the pixel electrode, wherein the passivation layer comprises a polymer selected from the group consisting of epoxy, polyurethane, silicon, polyacrylate and polyimide polymers.

This aspect of the invention may hereinafter for convenience be referred to as the "buried transistor" backplane of the invention. In such a buried transistor backplane, the passivation layer may be formed from a thermally curable polymer or a radiation curable polymer. In a preferred from of such a buried transistor backplane, the substrate comprises a metal film covered with an insulating layer, the transistor being formed on the insulating layer. The substrate may, for example, comprise a stainless steel foil covered with a polyimide insulating layer.

This invention extends to an electro-optic display including a buried transistor backplane of the invention. Thus, this invention provides an electro-optic display comprising:

a layer of an electro-optic medium having first and second display states differing in at least one optical property, the electro-optic medium being capable of being changed from its first to its second display state by application of an electric field to the medium; and a buried transistor backplane of the present invention disposed adjacent the layer of electro-optic medium, and arranged, upon application of a voltage to the pixel electrode thereof, to apply an electric field to the electro-optic medium.

This electro-optic display may use any of the types of electro-optic medium previously discussed.

DETAILED DESCRIPTION

As already indicated, this invention has several different aspects, each providing an improvement in backplanes for electro-optic displays; some aspects of the invention may also be useful in other applications. Hereinafter, the major aspects of the present invention will be described separately, but it should be understood that more than one aspect of the invention may be used in the fabrication of a single backplane or other electronic component. For example, a MEMS backplane of the present invention may be fabricated using an embossing method of the present invention.

Part A: MEMS Backplane

As already discussed, prior art active matrix displays require non-linear (transistor or diode) switching elements at each pixel. Currently non-linear transistor elements may be fabricated from amorphous silicon, polysilicon and organic semiconductors. Diode switching elements include metal insulator metal (MIM), metal semiconductor insulator (MSI), Schottky, and NIN diodes. These switching elements, while capable of driving electro-optic displays, have certain disadvantages.

Amorphous and polycrystalline silicon based transistors require relatively high temperature (>200° C.) deposition steps to produce stable devices. The need for such high temperature processing in practice limits the maximum size of flexible substrates that can be used in fabrication, because differences in coefficients of thermal expansion will cause mis-registration above a certain size. (As noted above, one of the attractive features of certain types of electro-optic displays is that they can be formed on flexible substrates, thus providing flexible, robust displays of types not possible with conventional liquid crystal displays.) Dimensionally stable flexible substrates such as metal foils require additional processing steps such as polishing, planarization and passivation. Organic transistors can be fabricated at low temperatures but tend to have short working lifetimes and to be sensitive to oxygen and moisture. The on/off ratio of either type of switching element is less than is desirable and is limited by the silicon mobility of the semiconductor layer (<1.0 cm$^2$/Vs for amorphous silicon and <300 cm$^2$/Vs for polycrystalline silicon. Transistor switches have relatively large gate to pixel stray capacitance, which causes voltage coupling leading to DC voltage imbalances at the pixel, and thus possibly undesirable artifacts on the image displayed.

Diodes have very large select line to pixel parasitic capacitance and thus require tight design rules. Also, for reasons explained in the aforementioned WO 01/07961, it is advantageous to provide a capacitor for each pixel in a backplane in order to maintain the driving voltage across the pixel, and it is difficult to provide such a capacitor in a diode based backplane.

The MEMS backplane of the present invention reduces or eliminates these problems of prior art backplanes. A preferred form of such a MEMS backplane for an electro-optic display has a plurality of MEMS switches and is useful for addressing a flat panel display, such as an electrophoretic display.

A preferred process of the present invention for fabricating such a MEMS backplane will now be described, though by way of illustration only, with reference to FIGS. 1A to 1D of the accompanying drawings, which are schematic side elevations of a single MEMS switch at various stages in the fabrication process, and FIG. 2, which is a top plan view of part of the completed backplane.

Figure 2:
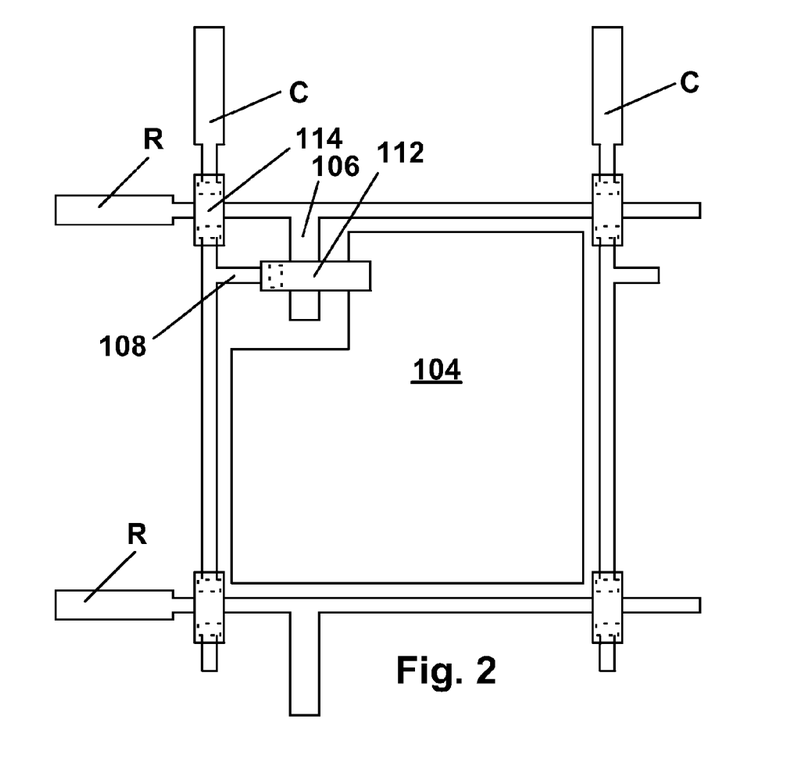
FIG. 2 is a top plan view of part of the finished backplane shown in FIG. 1D.

As will readily be apparent to those skilled in fabrication of active matrix displays from FIG. 2, apart from the presence of the MEMS switches, the backplane shown in FIG. 2 closely resembles a conventional transistor-based active matrix backplane. The backplane comprises a plurality of parallel row electrodes R, which are connected to a row driver (not shown) of conventional design such that at any given moment only one of the row electrodes R is selected (i.e., has a working voltage applied thereto), while the other rows are typically set to the same voltage a the single common electrode which is provided on the opposed side of the electro-optic medium from the illustrated backplane; after a predetermined interval, the originally-selected row electrode R is deselected, the next row electrode R is selected, and the sequence continues so that each row electrode R is selected in turn in a cyclic manner. The backplane further comprises column electrodes C, which run parallel to each other but perpendicular to the row electrodes, and first or pixel electrodes 104, only one of which is shown in FIG. 2. The pixel electrodes 104 are arranged in a rectangular array such that each pixel electrode is uniquely associated with the intersection of one row electrode R and one column electrode C. The pixel electrodes 104 are connected to their associated column electrodes C via a MEMS switch comprising a cantilever beam 112, an actuator (or second) electrode 106 (which has the form of an extension of the associated row electrode R, and a source (or third) electrode 108, which has the form of an extension of the associated column electrode C. As will be apparent to those familiar with MEMS switches, in the absence of a working voltage on the actuator electrode 106, with MEMS switch remains in its open position the free end (the left hand end as illustrated in FIG. 2) of the cantilever beam 112 spaced from the source electrode 108, and hence there is no electrical contact between this pixel electrode 104 and the associated column electrode C. However, when the row driver selects a specific row and applies the working voltage to the selected row electrode R, the working voltage appears on the actuator electrode 106 and the cantilever beam 112 is drawn downwardly so that the free end thereof contacts the source electrode 108, hence establishing electrical contact between this pixel electrode 104 and the associated column electrode C and placing the pixel electrode 104 at the same voltage as the associated column electrode C. Hence, only the pixel electrodes in the selected row (i.e., those associated with the selected row electrode R) are placed at the same voltages as their associated column electrodes C, and the writing of an electro-optic medium placed adjacent the display proceeds in a line-by-line manner exactly analogous to that of a conventional transistor-based backplane.

The backplane shown in FIG. 2 further comprises capacitor electrodes 114, one associated with each pixel electrode 104, the capacitor electrodes 114 forming capacitors with the adjacent portions of the column electrodes C.

Figure 1A:
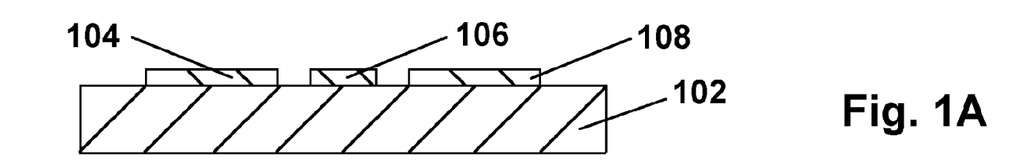
FIGS. 1A to 1D of the accompanying drawings are schematic side elevations of a portion of a MEMS backplane of the present invention, this portion comprising a single microelectromechanical switch, the side elevations being taken at various stages during the fabrication of the backplane.
Figure 1B:
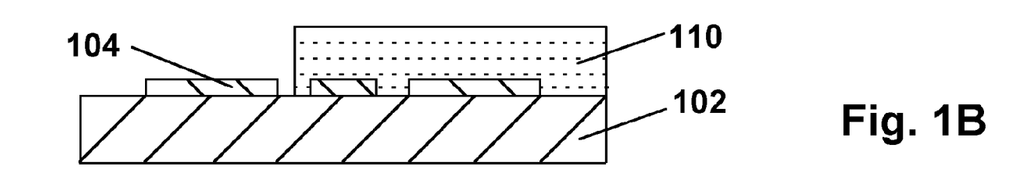
Figure 1C:
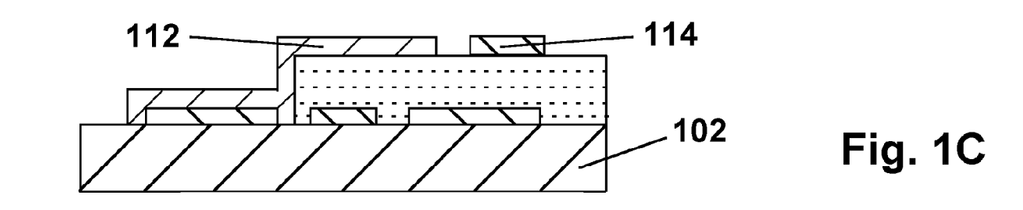

The process used to form the backplane shown in FIG. 2 will now be described with reference to FIGS. 1A to 1D. As shown in FIG. 1A, the process begins from an insulating substrate 102, which may, for example, be a polymeric film or a polymer-coated metal foil. In the first stage of the process, a thin metal layer is deposited on the substrate 102 and patterned in any convenient manner to form three electrodes, namely the pixel electrode 104, the "gate" or actuator electrode 106 and the source electrode 108 to produce the structure shown in FIG. 1A. In a preferred form of the process the metal layer is gold deposited by sputter deposition to a thickness of approximately 100 nm. Next, a sacrificial layer 110 is deposited in the form shown in FIG. 1B to cover the actuator and source electrodes but leave the pixel electrode 104 exposed; note that, as shown in FIG. 1B, this sacrificial layer 110 covers part but not all of the gap between the pixel electrode 104 and the actuator electrode 106. The sacrificial layer 110 is desirably copper deposited by sputter deposition at room temperature to a thickness of approximately 1 µm. The sacrificial layer is then etched to define the base area of a mechanical cantilever beam and support posts of a metal two substrate capacitor. A photoresist layer is added and patterned to leave apertures into which the cantilever beam 112 and a capacitor electrode 114 are then plated, preferably using a room temperature electroplate solution and a low stress material such as gold (the position of the capacitor electrode 114 is distorted in FIGS. 1A to 1D for ease of illustration). The thickness of the beam 112 is desirably approximately 2-4 µm. Finally the photoresist layer is stripped to give the structure shown in FIG. 1C and then the sacrificial layer 110 is removed, preferably using a wet chemical etch, thus freeing the cantilever beam 112.

Figure 3:
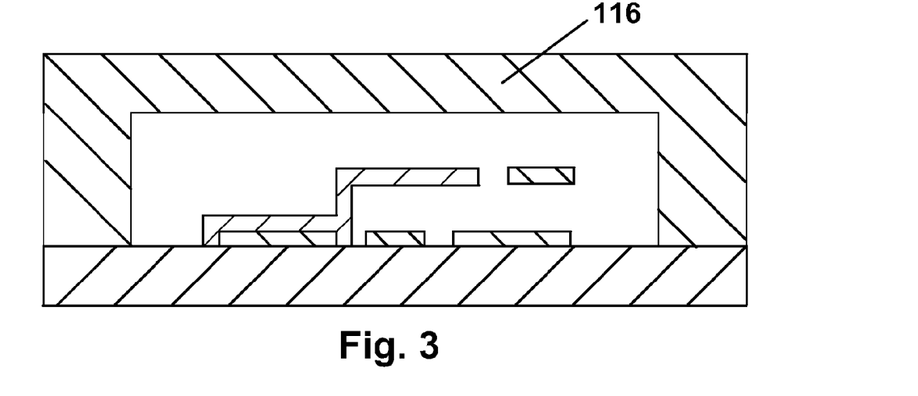
FIG. 3 is a schematic side elevation, similar to that of FIG. 1D, showing a portion of a modified MEMS backplane of the present invention provided with a protective encapsulant layer.

Depending upon the type of electro-optic medium used, it may be desirable or essential to maintain physical separation between the MEMS switches and the electro-optic medium, and for this purpose a protective encapsulation layer may be added to the backplane to prevent the MEMS switches being accidentally damaged after the sacrificial layer has been removed. As shown in FIG. 3, a preferred form of such a protective encapsulation layer comprises a pre-patterned polyimide or other polymeric encapsulant 116 aligned with the MEMS switch and bonded to the substrate.

The MEMS-based backplane of the present invention provides several important technical advantages. A MEMS switch has a low impedance in its "on" state and a very high impedance in its "off" state, thus providing an excellent on/off ratio and thus avoiding problems associated with leakage currents passing through other types of non-linear elements. As discussed above with reference to FIGS. 1A-1D, a MEMS switch can be fabricated in a simple process using only three or four masks and not requiring any high temperature processing steps. Thus, the process can be used on low cost flexible substrates, for example poly(ethylene terephthalate) films. Furthermore, the MEMS fabrication process described above is less susceptible to environmental contamination during processing than are processes for fabricating backplanes based on thin film transistors or diodes, which tends to reduce the cost of the clean room facilities needed. Also, the fabrication process for a MEMS-based backplane can make use of some coarse patterning steps.

A MEMS switch has a very small select line to pixel capacitance, so that a MEMS-based backplane has smaller DC imbalances due to such capacitance than a similar transistor- or diode-based backplane, and this reduction in DC imbalance is important in extending the working lifetime and/or the display properties of some types of electro-optic media, especially particle-based electrophoretic media. Also, because the overlapping areas of the select lines and data lines in a MEMS-based display can be separated by air (cf. FIGS. 1D and 2), the unwanted capacitance per unit area of such overlapping areas is kept to the absolute minimum, since air has a dielectric constant of almost exactly 1, and the resultant reduced capacitance reduces the power consumption of the display, since a large proportion of the power consumption is accounted for by charging and discharging of the capacitances associated with the data lines.

Figure 1D:
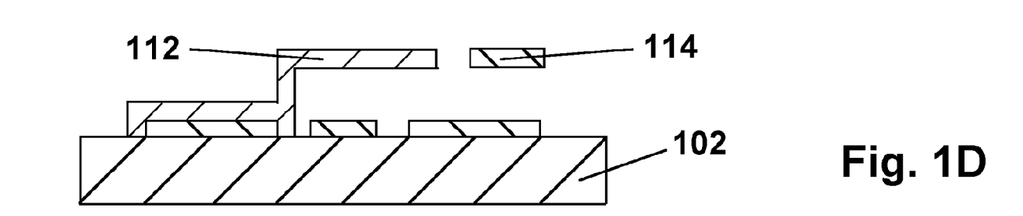

In a modified form of the MEMS-based backplane of the present invention, the cantilever beam shown in FIGS. 1D, 2 and 3 may be replaced by a MEMS diaphragm, which is less likely to suffer from stiction than a cantilever beam.

Part B: Embossed Process of the Invention

As already discussed, fabrication of backplanes involves patterning small features on a substrate. As shown in Table 1, there is a spectrum of critical dimension length scales required for various patterning applications, and a range of technologies has been used to successfully achieve these dimensions:

TABLE 1

Processes used in various industries to pattern fine features

| Industry | Critical Dimensions | Patterned Material | Commercially Used Technologies |
|---|---|---|---|
| Printed circuit board | >150 µm | Solder, copper, other metals, insulators | Solder masking, screen printing, photolithography |
| Flex circuit, MCMs | >15 µm | Copper, chrome, other metals, insulators, semiconductors | Photolithography, screen printing |
| Flat panel | >1 µm | Aluminum, chrome, other metals, insulators, semiconductors | Photolithography |
| Microprocessors, memory, other microchips | <0.5 µm | Aluminum, chrome, other metals, insulators, semiconductors | Photolithography |

Also as already discussed, to produce very small features, say with critical dimensions <25 µm, photolithography has clearly emerged as the dominant technology. Due to extensive research during the last few decades, photolithographic techniques have improved to the point where 0.13 µm processes are in full-scale production and 0.10 µm processes are being studied. While photolithography has proven itself as a scalable technology capable of large scale industrial application, it is generally regarded as expensive due to the large number of process steps and the expensive capital costs associated with photolithographic production equipment.

As already mentioned, a second aspect of the present invention relates to the use of an alternative patterning technology, namely the embossed resist process, to pattern components of backplanes and other electronic devices. The embossed resist process offers several advantages over a conventional photolithographic process, and enables high throughput roll-to-roll processing, feature sizes smaller than 1 µm, and reduced fixed and variable process costs.

Figure 4A:
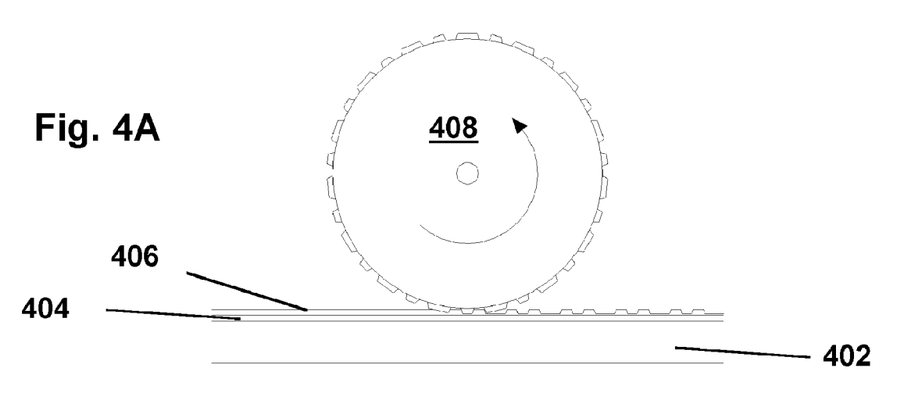
FIGS. 4A to 4E are schematic side elevations showing various stages of an embossing process of the present invention.
Figure 4B:
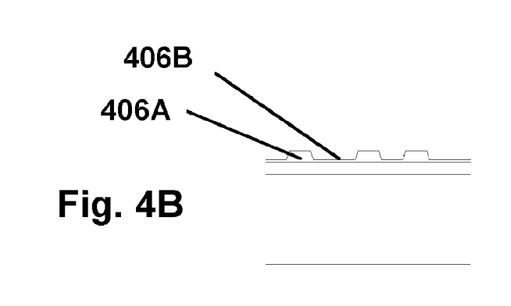

FIGS. 4A-4E of the accompanying drawings illustrate an embossing process of the present invention. As shown in FIG. 4A, a substrate 402 is first coated with a material 404 to be patterned; this material may be a metal, an insulator, a semiconductor or any other type of patternable material. A layer of an embossable material (hereinafter for convenience called a "resist") 406 is then applied over the material 404, and the resist is embossed using a "master stamp" (which is preferably in the form of an embossed roller 408, as illustrated in FIG. 4A) to impart a texture or pattern to the resist. As best seen in FIG. 4B, this embossing step shapes the resist 406 into thick (second) regions 406A and thin (first) regions 406B, the division of the resist 406 between the two types of regions being predetermined in any desired manner by the patterning of the roller 408.

Figure 4C:
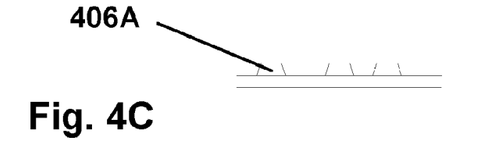
Figure 4D:
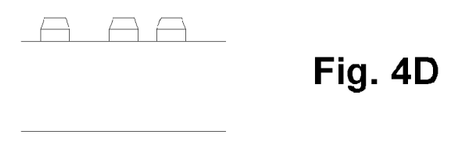
Figure 4E:
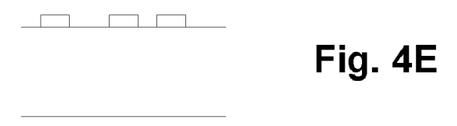

In the next step of the process, the patterned resist is etched slightly (using any of the conventional etching processes well known to those skilled in semiconductor fabrication technology) to an extent sufficient to remove the thin regions 406B and expose the underlying material 404, while leaving parts of the material 404 still covered by the thick regions 406A, thus producing the structure shown in FIG. 4C. The substrate is then subjected to a second etching operation to etch the exposed parts of the material 404 to the desired extent, thus producing the structure shown in FIG. 4D, and finally the resist is stripped from the substrate as shown in FIG. 4E to leave the final patterned material 404 on the substrate 402.

The embossable material applied to the surface may be chosen to optimize the patterning step. Commercially available photoresists may be used as the embossable material. The photoresist may be embossed at temperatures exceeding its glass transition temperature ($T_g$), and may be wet or dry etched to expose the underlying material. The resist can be chosen to be resistant to the chemistry used to etch the underlying material, and to be easily stripped from the surface thereof after patterning of the underlying material. In some cases, it may necessary or desirable to "soft bake" the resist to remove solvents therefrom before embossing of the resist. Also, in some cases it may be preferable to "hard bake" the resist after etching to remove the thin regions 406B to ensure that the resist can withstand the etching of the underlying material.

A molten material (polymeric or otherwise) may be used as the embossable material or resist. For instance, waxy materials (e.g. alkanes such as octacosane, nonadecane, etc.) may be used. These waxy materials may be coated in the liquid phase using a heated slot die, intaglio plate, spin coating chuck, offset printing rollers, or other similar devices known to those skilled in the field. The molten material will typically solidify into a thin, embossable film as it is deposited, and may then be embossed and etched back using wet or dry etching techniques. The patterned resist film serves as an etch mask for the underlying material, and, as already mentioned, is stripped following the etching of the underlying material. Solvents such as hexane strip the aforementioned waxy materials effectively, and such a process is advantageous because it is not necessary to dry solvents from the resist after its deposition. Also, with proper selection ("tuning") of the chemicals used, relatively non-toxic solvents may be used to strip the wavy material from the underlying material after patterning is complete.

Figure 5A:
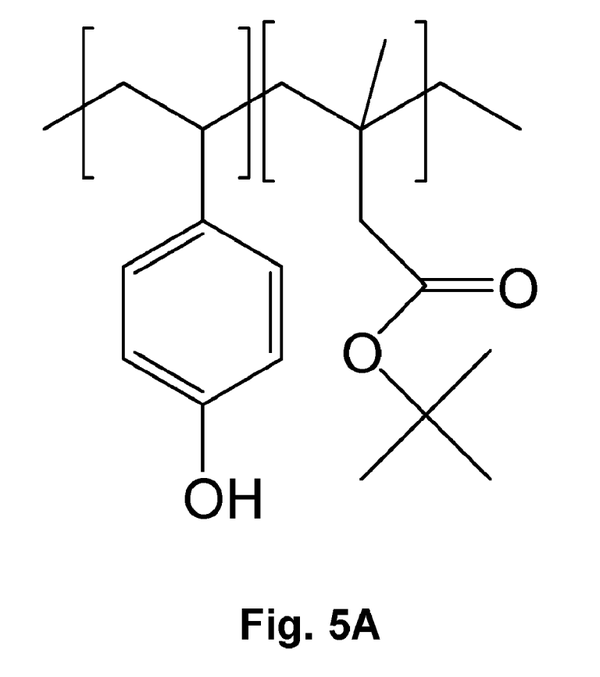
FIG. 5A shows the formula of a preferred polymer for use in the embossing process of the present invention.

A co-polymer tuned for the embossed-resist concept may be used, for example, the co-polymer of 4-hydroxystyrene and butyl-methacrylate shown in FIG. 5A. The 4-hydroxystyrene component of this block copolymer is base soluble, and the copolymer deblocks in the presence of an acid. Consequently, the copolymer exhibits several beneficial properties in the embossed resist process. Firstly, adjustment of the molecular weight of the polymer allows its glass transition temperature to be adjusted within the range of from about 100 to about 150° C., which is an acceptable embossing temperature range. Secondly, a weak base solution may be used to etch back the patterned copolymer, thereby exposing the underlying material. The acid used to etch most common underlying materials (metals, semiconductors, insulators) will deblock the copolymer during etching of the underlying material, thus enabling easy removal of the resist after etching is complete.

Figure 5B:
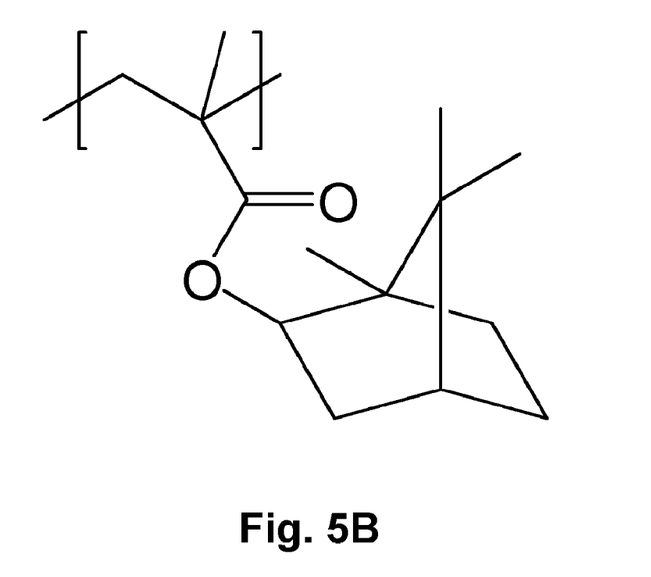
FIG. 5B shows the formula of an alternative methacrylate repeating unit which can be substituted for the methacrylate repeating unit shown in FIG. 5A.

Alternatively, the methacrylate-based block shown in FIG. 5B may be used in place of the butyl methacrylate block shown in FIG. 5A in the embossed resist copolymer. The use of this different block enables the embossed resist to thermally deblock at a temperature of approximately 175 to 180° C. Thermal deblocking is a helpful alternative route if the underlying material to be patterned is not etched using a conventional acid etch chemistry as described above.

The master stamps used to perform the embossing operation in the process of the present invention may be constructed using a variety of prior art microfabrication techniques. Preferably, the master stamps are made using the techniques commonly employed by compact disk manufacturers to make nickel master stamps for the manufacture of compact disks (CD's) and DVD's. These techniques require the formation of a photolithographically defined template, against which a nickel master stamp is electroformed.

The nickel foils that result from the CD and DVD mastering process are well suited for use in the present invention, but some modifications of conventional CD/DVD processes are required. Firstly, the pits on a CD are typically less than 250 nm deep, whereas in the present invention, it is typically desirable to make the features on the master stamp of the order of 1 to 10 μm deep, because to achieve a good imprint the stamp features should be approximately 2 to 5 times as deep as the resist thickness, which is typically of the order of 100 to 1000 nm.

To produce such deep features on the master, photoresists optimized for thick film processing should be used during master fabrication. For instance, SU-8 resist may be used to produce a film as thick as 100 μm or more. In order to ensure easy release of the nickel master from its template, it is preferable to build sloped sidewalls on the features of the master. The sloped sidewall technique has been employed in forming masters used to replicate high-throughput drug discovery systems, but has not apparently been used in an embossed resist process.

For some geometric features on master stamps, it may be useful to employ alternative techniques, for example reactive ion etching (RIE) or laser ablation to etch a silicon wafer or glass substrate with the desired features, as is conventionally done in the manufacture of advanced MEMS devices.

The embossing process of the present invention offers several distinct advantages over conventional photolithographic techniques for patterning materials. The embossing process promises lower fixed and variable costs than lithography, because it replaces the conventional lithography UV exposure tool with a mechanical embossing tool, and conventional photoresists with cheap, chemically simple materials. The embossing process of the present invention has been shown to achieve features as small as 6 to 10 nm in characteristic dimension, which is 5 to 10 times smaller than is achievable with advanced photolithography processes. When using the embodiment of the present invention which employs a molten polymer resist, the soft and hard bake steps required in photolithography are completely eliminated. At feature sizes down to micron scale, the embossed resist process may be successfully completed using all-wet processing, i.e. no expensive vacuum steps are required. Finally, the embossed resist process is well suited to high-throughput roll-to-roll patterning using a roller as the master stamp, as shown in FIG. 4A.

Part C: Buried Transistor Backplanes

Figure 6:
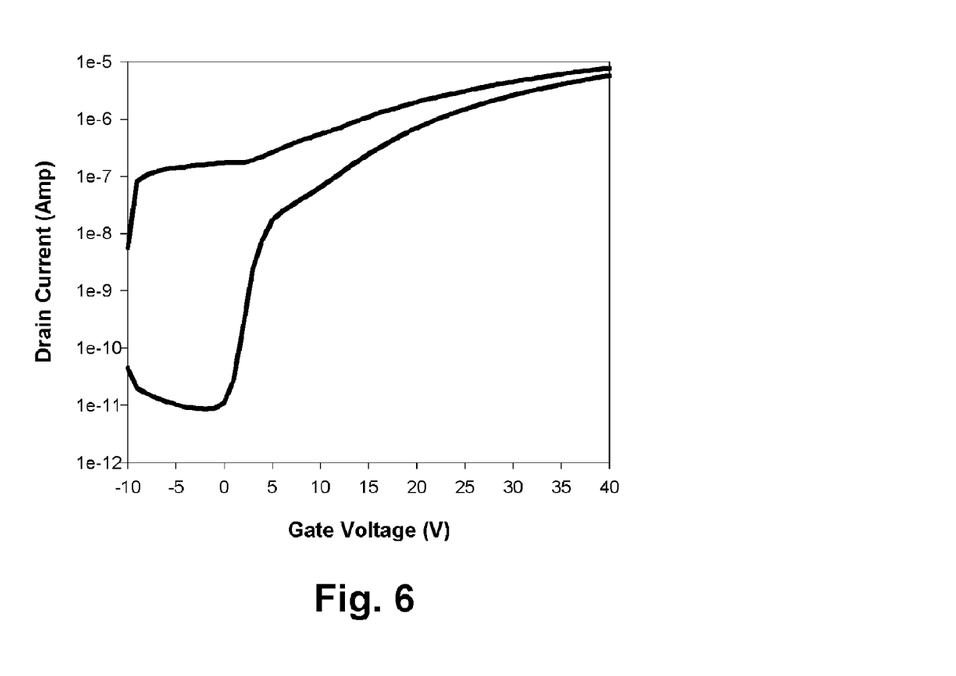
FIGS. 6 to 12 are current/gate voltage curves for various buried transistors intended for use in buried transistor backplanes of the present invention, and similar curves for certain control experiments.
Figure 7:
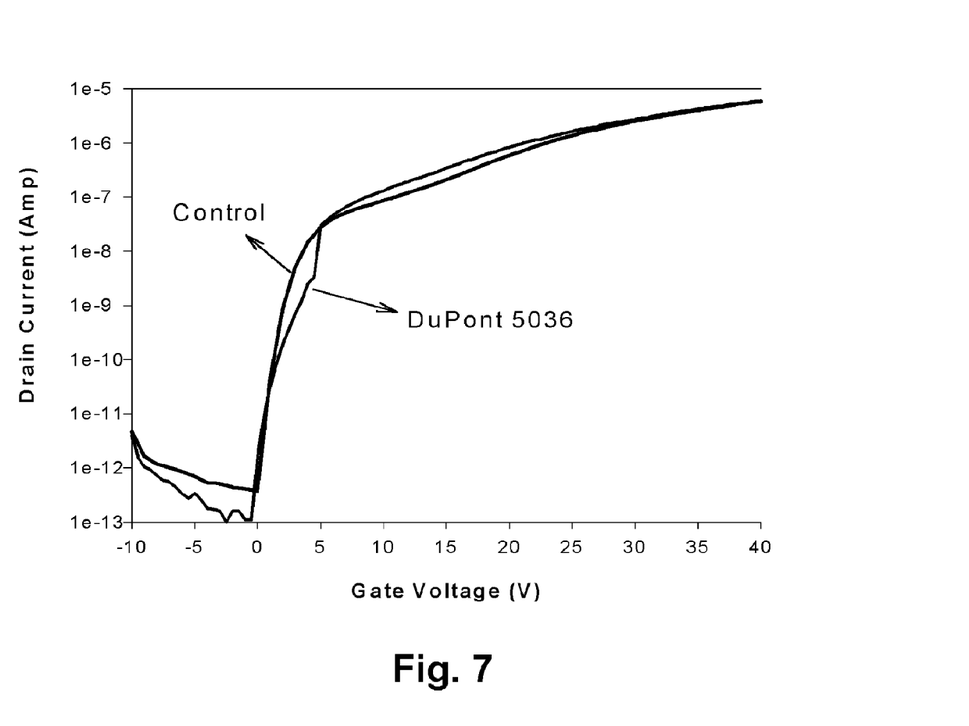
Figure 8:
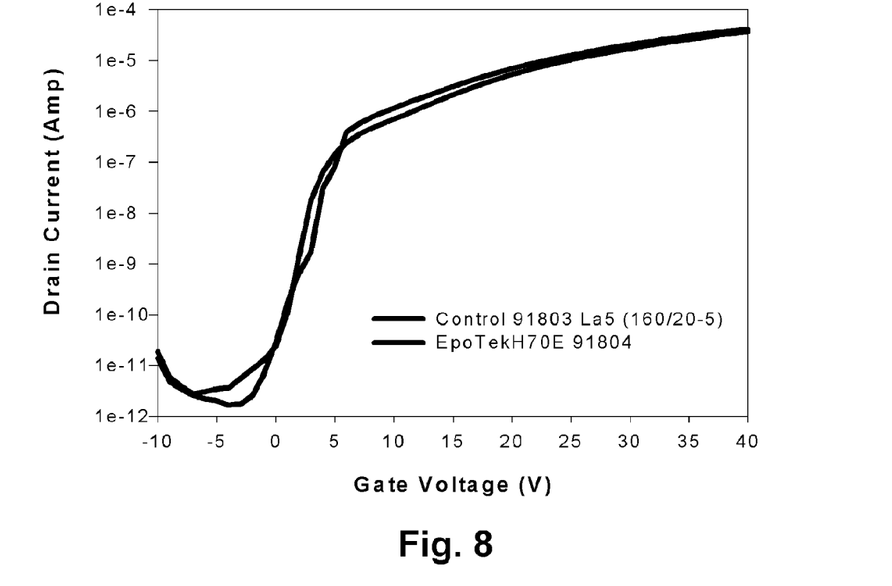
Figure 9:
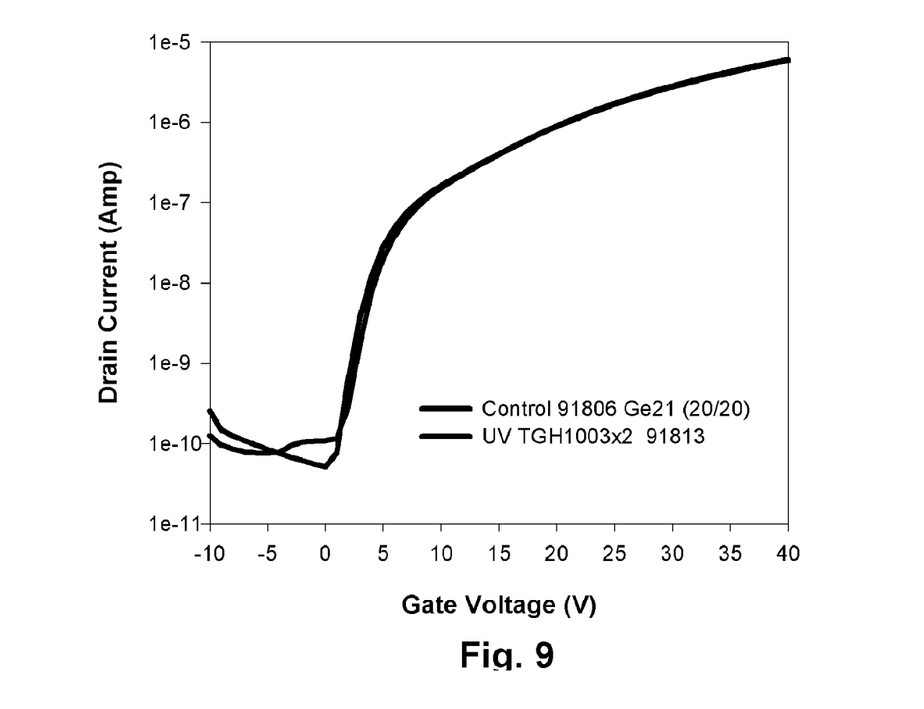
Figure 10:
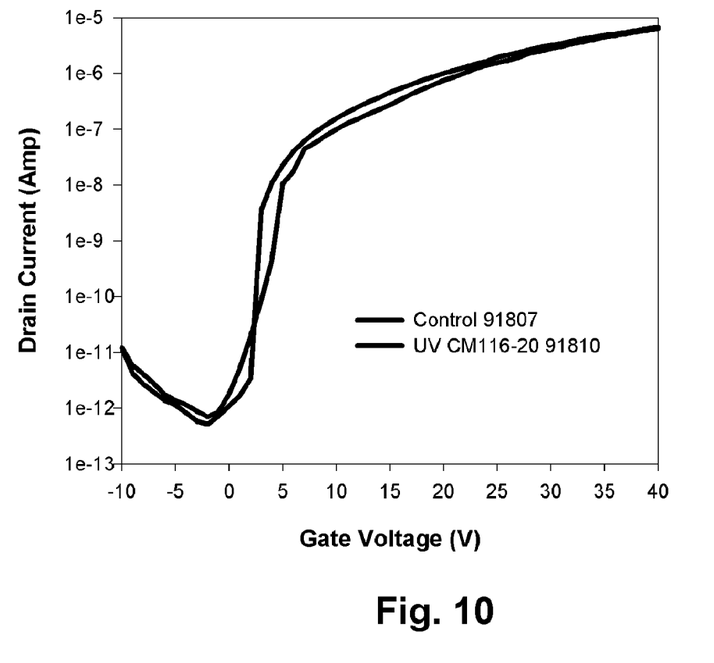

As already mentioned, in the manufacture of an electro-optic display, the backplane and the front part of the display are typically fabricated as separate units and laminated together to produce the final display. Such lamination typically requires the use of a lamination adhesive to bond the backplane to the front part of the display. Thus, the exposed surface of the backplane as fabricated is, in the final display, exposed to the lamination adhesive, and in many cases lamination adhesives contain materials which may deleteriously affect the performance of transistors or other non-linear devices on the exposed surface of the backplane. For example, its has been found that direct application of certain commercial polyurethane lamination adhesives to the channels of amorphous silicon TFT's effectively destroys the transistors; as shown in FIG. 6 of the accompanying drawings, in one such experiment, it was found that the on/off ratio of the transistors decreased from 106 to about 10. Furthermore, some types of electro-optic media contain mobile species which can migrate through the lamination adhesive and adversely affect the transistors or other non-linear devices. For example, particle-based electrophoretic media contain hydrocarbon solvents which can migrate in this manner and may affect the characteristics of amorphous silicon transistors. Finally, amorphous silicon TFT's may also be degraded by light and moisture which can enter the TFT's via the electro-optic medium; although many electro-optic media, such as encapsulated particle-based electrophoretic media, are normally regarded as opaque, some light does penetrate such media, for example via small gaps between capsules.

To avoid such problems, it is known to interpose a barrier or passivation layer between the non-linear devices and the electro-optic medium. For example, US Patent Application Publication No. 2002/0119584 describes a backplane having a so-called "buried transistor design". In such a design, only the pixel electrodes are exposed upon the surface of final backplane prior to lamination; the transistors of the backplane are "buried" underneath a passivation layer, with the drains of the transistors being connected to their associated pixel electrodes by conductive vias passing through the passivation layer. In the preferred form of this design as described in the aforementioned published application, the passivation layer comprises more than about 5 μm of silicon nitride deposited by plasma enhanced chemical vapor deposition (PECVD), and this relatively thick layer must cover both the channels of the transistors and the data lines. It is difficult if not impossible to deposit such a thick nitride layer without cracking. Accordingly, it is desirable to find an alternative material to replace the silicon nitride as the passivation layer.

It has now been found that epoxy, polyurethane, silicon, polyacrylate and polyimide polymers can be used in place of silicon nitride as passivation layers to encapsulate and protect the transistors or other non-linear devices of backplanes used in electro-optic displays. Preferred polymers can be applied to the backplane by screen printing, a process which much less complicated and requires less equipment than PECVD.

The polymer encapsulants used in the present invention may be curable either thermally or by radiation, preferably UV radiation. Preferred thermally curable materials include EpoTek H70E-2LC from Epoxy Technology, and DuPont 5036 from DuPont Electronic Materials. Preferred UV curable materials include TGH 1003x2 from Allied Photochemical Inc., and CM116-20 from Creative Materials Inc. The properties and curing conditions of these material are summarized in Table 2 below:

TABLE 2

Polymeric materials

| Screen printable encapsulants | Cure Method | Viscosity, cps. | Color |
|---|---|---|---|
| DuPont 5036 | 120-130° C., 5 mins. | 30,000-50,000 | Opaque |
| Epotek H70E-2LC (a good moisture barrier) | 120° C., 15 mins. | 30,000 | Black |
| TGH 1003x2 | UV | 3400 | Blue |
| Creative Materials 116-20 (has good resistance to humidity, temperature and solvents) | UV | 10,000 | Clear |

Figure 11:
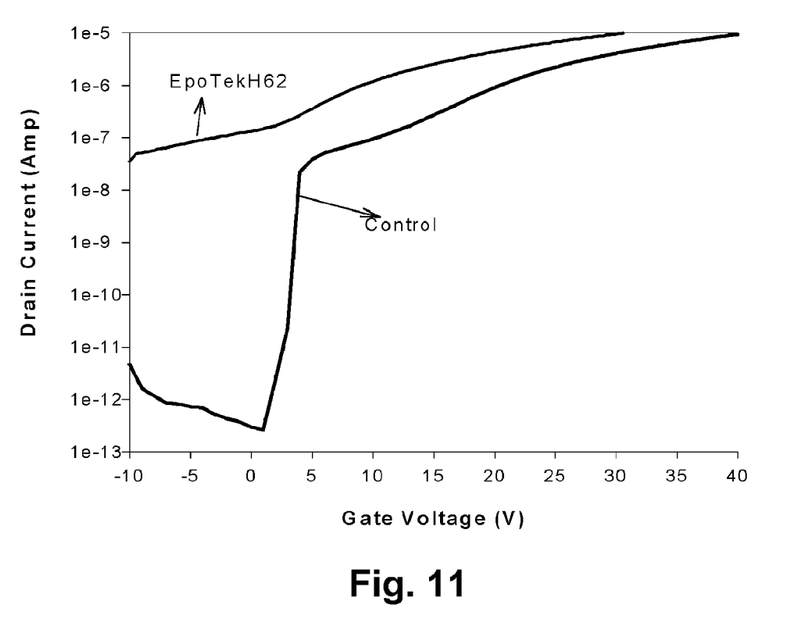
Figure 12:
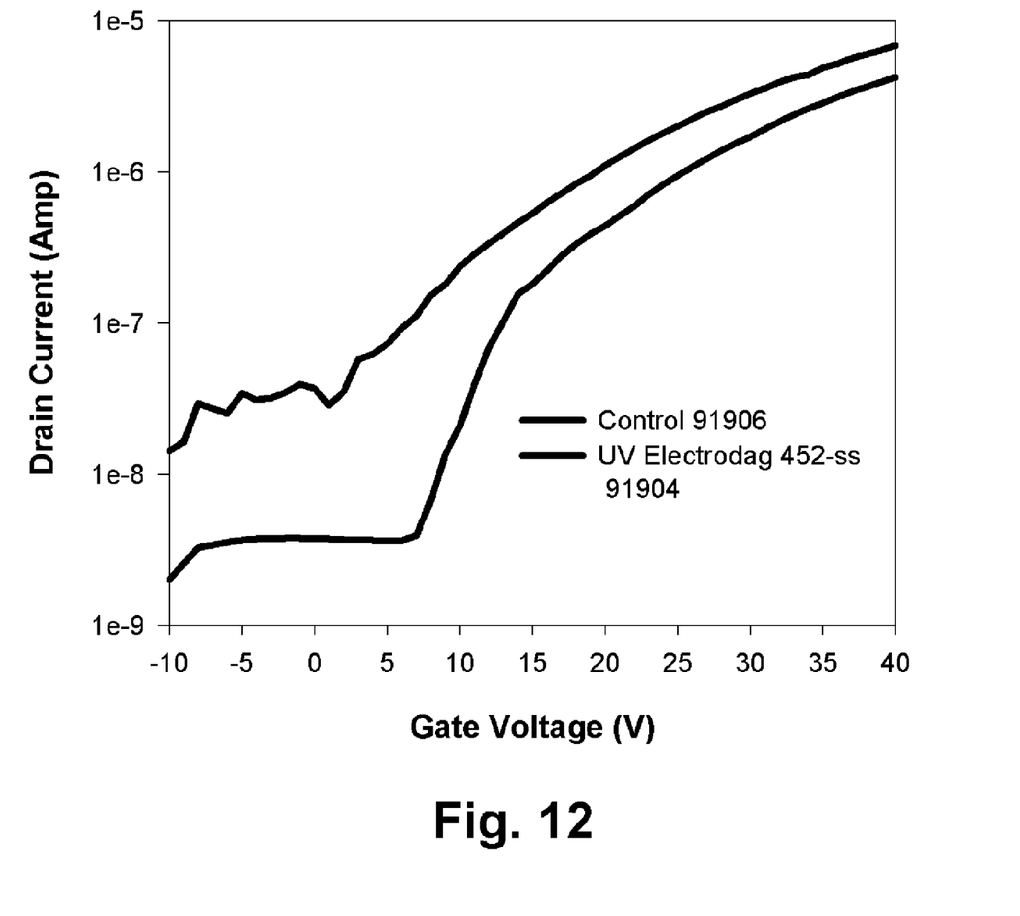

These materials were tested using amorphous silicon TFT's fabricated on a stainless steel film coated with a polyimide layer substantially as described in the aforementioned 2002/0019081. Encapsulant drops with diameter of 20-180 μm were applied on the channel areas of the TFT's using a probe station. The thermally curable coatings were cured in a regular oven at the required conditions as listed in Table 2. For the UV curable coatings, an ELC-4000 Light Curing Unit was used for a curing time of 1-2 minute. Following curing of the encapsulant, current/voltage curves for the TFT's were generated in the conventional manner, and the results are shown in FIGS. 7-10 respectively. By way of comparison, FIG. 11 shows a similar curve for a TFT encapsulated with EpoTek H62 (a thermally curable polymer from the same manufacturer as EpoTek H70E-2LC), while FIG. 12 shows a similar curve for a TFT encapsulated with Electrodag 452SS (a UV curable polymer from Acheson Industries, Inc.).

FIGS. 7-10 show that all the materials listed in Table 2 above gave good results. The off current is lower after encapsulation with DuPont 5036. The TFT performance remains the same when EpoTek H70E-2LC is used as the encapsulant. The TGH 1003x2 coated TFT's have the same performance compared to the control devices. The CM 116-20 encapsulated TFT's have better sub-threshold slope than the control device. However, FIGS. 11 and 12 illustrate what can happen if the wrong encapsulant is chosen. FIG. 11 shows that the amorphous silicon TFT's were almost destroyed when encapsulated by EpoTek H62, while FIG. 12 shows that the TFT's were degraded when encapsulated with Electrodag 452SS, and that the TFT's become more leaky, with high off currents.

The present invention thus provides a low cost process for the protection of transistors and other non-linear devices used in the backplanes of electro-optic displays. The polymeric encapsulants used can be deposited and patterned by screen-printing, a low cost process as compared with the PECVD silicon nitride deposition and photolithography patterning process used in the prior art process discussed above.

Numerous changes and modifications can be made in the preferred embodiments of the present invention already described without departing from the spirit and skill of the invention. For example, although the various aspects of the invention have been described above primarily in connection with their use in conjunction with encapsulated particle-based electrophoretic media, it will be appreciated that any of the types of electro-optic media discussed above can be used in electro-optic displays of the present invention. Accordingly, the foregoing description is to be construed in an illustrative and not in a limitative sense.

The invention claimed is:

1. A process for forming a backplane for an electro-optic display, the process comprising:
   providing a substrate;
   forming spaced first, second and third electrodes on the substrate;
   thereafter forming a sacrificial layer on the substrate, the sacrificial layer covering the first and second electrodes but leaving at least part of the third electrode exposed;
   thereafter depositing conductive material on to the substrate so as to form a cantilever beam member having a first section contacting the exposed part of the third electrode, and a second section extending over the sacrificial layer so as to extend over at least part of each of the second and first electrodes; and
   thereafter removing the sacrificial layer, thereby leaving the second section of the cantilever beam member free to into and out of contact with the first electrode under the influence of a voltage applied to the second electrode.

2. A process according to claim 1 wherein the step of depositing conductive material on to the substrate further comprises depositing a capacitor electrode spaced from the cantilever beam member but overlying part of the first electrode so that the capacitor electrode and the first electrode together form a capacitor.

3. A process according to claim 1 further comprising, after removal of the sacrificial layer, depositing an encapsulant layer on to the substrate so as to cover at least the cantilever beam member.

4. A process for forming at least one electronic component of an electronic circuit on a substrate, the process comprising:
   forming on the substrate a layer of a component material which can form the at least one electronic component;
   forming a layer of an embossable material over the layer of component material;
   imagewise embossing the layer of embossable material to form at least one first portion and at least one second portion having a greater thickness than that of the at least one first portion;
   etching the embossable material to remove the at least one first portion thereof while leaving embossable material present in the at least one second portion thereof, thereby exposing the component material underlying the at least one first portion of the embossable material;
   thereafter etching the exposed portions of the component material, thereby patterning the layer of component material and forming the at least one electronic component therein.

5. A process according to claim 4 further comprising, after patterning of the layer of component material, removing the remaining embossable material from the substrate.

6. A process according to claim 4 wherein the imagewise embossing of the embossable material is effected by a roller.

7. A process according to claim 4 wherein the embossable material comprises a photoresist.

8. A process according to claim 7 wherein the photoresist is heated prior to the imagewise embossing thereof, the heating serving to remove solvent from the photoresist.

9. A process according to claim 7 wherein the photoresist is heated after the etching to remove the at least one first portion thereof, but before the etching of the component material.

10. A process according to claim 4 wherein the embossable material comprises a copolymer having repeating units derived from at least one base soluble monomer.

11. A process according to claim 10 wherein the at least one base soluble monomer comprises a blocking group which deblocks in the presence of an acid.

12. A process according to claim 10 wherein the copolymer comprises repeating units derived from 4-hydroxystyrene and a methacrylate.

13. A backplane for an electro-optic display, the backplane comprising:
- a substrate;
- a transistor disposed on the substrate;
- a passivation layer covering the transistor;
- a pixel electrode disposed on the opposed side of the passivation layer from the transistor; and
- a conductive via passing through the passivation layer and electrically connecting the transistor to the pixel electrode,
- wherein the passivation layer comprises a polymer selected from the group consisting of epoxy, polyurethane, silicon, polyacrylate and polyimide polymers.

14. A backplane according to claim 13 wherein the passivation layer comprises a thermally curable polymer.

15. A backplane according to claim 13 wherein the passivation layer comprises a radiation curable polymer.

16. A backplane according to claim 13 wherein the substrate comprises a metal film covered with an insulating layer, the transistor being formed on the insulating layer.

17. A backplane according to claim 16 wherein the substrate comprises a stainless steel foil covered with a polyimide insulating layer.

18. An electro-optic display comprising:
- a layer of an electro-optic medium having first and second display states differing in at least one optical property, the electro-optic medium being capable of being changed from its first to its second display state by application of an electric field to the medium;
- a backplane according to claim 13 disposed adjacent the layer of electro-optic medium, and arranged, upon application of a voltage to the pixel electrode thereof, to apply an electric field to the electro-optic medium.

* * * * *